United States Patent
Hartnett et al.

(10) Patent No.: US 10,476,684 B2
(45) Date of Patent: Nov. 12, 2019

(54) DUAL SOURCING POWER OVER ETHERNET ON A SINGLE DATA PATH

(71) Applicant: Crestron Electronics, Inc., Rockleigh, NJ (US)

(72) Inventors: John Hartnett, Rockleigh, NJ (US); Mark LaBosco, Rockleigh, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 11 days.

(21) Appl. No.: 15/172,245

(22) Filed: Jun. 3, 2016

(65) Prior Publication Data

US 2017/0351309 A1 Dec. 7, 2017

(51) Int. Cl.
*H04L 12/10* (2006.01)

(52) U.S. Cl.
CPC .................... *H04L 12/10* (2013.01)

(58) Field of Classification Search
CPC .................... G06F 1/26; H04L 12/10
See application file for complete search history.

(56) References Cited

U.S. PATENT DOCUMENTS

| | | | |
|---|---|---|---|
| 7,971,075 B2 | 6/2011 | Diab | |
| 8,044,747 B2 | 10/2011 | Yu et al. | |
| 8,217,527 B2 | 7/2012 | Diab | |
| 2012/0324120 A1* | 12/2012 | Lee | H04L 12/2838 709/228 |
| 2014/0103707 A1* | 4/2014 | Maymon | H04L 12/10 307/2 |

OTHER PUBLICATIONS

Akros Silicon, White Paper WP14, "Power-over-Ethernet Plus; An Overview," Rev. 1.1, Aug. 2008.
Texas Instruments, Application Report, SLVA498-Feb. 2012, "Implementing a 60-W, End-to-End PoE System".

* cited by examiner

*Primary Examiner* — Austin Hicks
(74) *Attorney, Agent, or Firm* — Crestron Electronics, Inc.

(57) ABSTRACT

Described herein is a data communication system using power over Ethernet (PoE) for power distribution, comprising a first and second powered device (PD), each of which is adapted to communicate with each other through an Ethernet data path (EDP) and is further adapted to receive direct current (DC) power using a PoE protocol, and a mid-span power injection device (MSPID) adapted to provide a communications interface such that data communications passes through the MSPID to and from each of the PDs, and wherein the MSPID is further adapted to provide a first DC power to only the first PD using the EDP, and to provide a second DC power to only the second PD using the EDP.

17 Claims, 5 Drawing Sheets

DUAL SOURCING POWER OVER ETHERNET ON A SINGLE DATA PATH

BACKGROUND

Technical Field

Aspects of the embodiments relate generally to powering Ethernet based devices and more particularly to systems, methods, and modes for supplying power to Ethernet based devices using power-over-Ethernet (PoE) cabling systems via a mid-span power injection device.

Background Art

As those of skill in the art can appreciate, Ethernet technology is widely used to transfer many different types of signals, including data, audio, and especially video. Ethernet, in many circumstances, is the technology of choice due to its high data throughput capacity. One significant area in which it is used is high definition (HD) video transfer devices, and even more advanced systems that utilize 4K horizontal resolution video systems. Ethernet, however, is not limited to just audio or video systems, but is also used, almost ubiquitously, in many intranet and internet systems.

As those of skill in the art can appreciate, all of those Ethernet devices need to be provided with power. Most of the time, this is not an issue. Most devices are located near other sources or sinks of data, and as such, because of the nature of the use of such devices, house or building power is generally available. There are circumstances, however, where Ethernet devices are not co-located with sources of power. For example, an Ethernet capable security video camera or remotely located display will need an external source of power. In addition, repeaters are often used for extended Ethernet runs that are located in corridors or locations (e.g., underground, above ground, among other locations) where there might not be power, and other remote installation uses abound. In those cases, PoE is a technology that lets network cables carry electrical power. That is, the Ethernet cable carries not only the data signals, but also power to the device that sources or sinks the data.

Accordingly, those of skill in the art appreciate several advantages to the use of PoE. These include time and cost savings by not having to install additional power cabling. Network cables generally do not have to be installed by qualified electricians. There is increased flexibility in not being tethered to an electrical outlet. As such, cameras and wireless access points can be located generally wherever they most make sense to be located, and readily repositioned if desired. Furthermore, PoE has proven to be a safe and reliable means of getting power to where it is needed. PoE is designed to protect network equipment from overload, under-powering, and incorrect installation. Finally, there is an element of scalability to PoE. However, as those of skill in the art can further appreciate, scalability is not unlimited, and there are limits as to how much power can be delivered, and for how much distance. Thus, there are circumstances in which remotely located power supplies are needed to power Ethernet devices.

In implementation, PoE mid-span devices have been used in 100 mega-bit (Mbit) systems, and in these cases, used the spare pairs. However, when Ethernet capabilities increased to giga-bit (Gbit) transmission rates, there were no more spare pairs, as all four cables were used for data transmissions. To get power over Gbit Ethernet cables, known systems incorporated transformers to inject direct current (DC) power. However, as those of skill in the art can appreciate, transformers in the signal path degrade the signals due to leakage inductance and interwinding capacitance. At 10 Gbit rates (included, e.g., HDBaseT usages), reduced signal integrity results in shorter allowable cable lengths, which increases costs.

Further, as known by those of skill in the art, most Ethernet communications are between a device and a switch. There are valid use cases for Ethernet devices other than switches being connected together, however. For example, a PoE camera can be connected directly to a PoE powered monitor. Another use case is to have a PoE powered switch and camera. This allows the switch to be located in places where no power exists. There are also use cases that include HDBaseT extenders, wherein an Ethernet transmitter is connected to an Ethernet receiver, and both devices receive power via the Ethernet cable. Another example is a transmitter connected to a power-over-HDBase T (PoH) monitor.

Accordingly, a need has arisen for systems, methods, and modes for supplying power to Ethernet based devices using PoE cabling systems via a mid-span power injection device.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for supplying power to Ethernet based devices using PoE cabling systems via a mid-span power injection device that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect of the embodiments, a data communication system using power over Ethernet (PoE) for power distribution is provided comprising a first and second powered device (PD), each of which is adapted to communicate with each other through an Ethernet data path (EDP) and is further adapted to receive direct current (DC) power using a PoE protocol, and a mid-span power injection device (MSPID) adapted to provide a communications interface such that data communications passes through the MSPID to and from each of the PDs, and wherein the MSPID is further adapted to provide a first DC power to only the first PD using the EDP, and to provide a second DC power to only the second PD using the EDP.

According to the first aspect of the embodiments, the EDP comprises at least one pair of twisted wires, each of the twisted wires of the at least one pair of twisted wires including a first portion and a second portion, each of the first and second portions including a first end connected to a respect PD, and each of the first and second portions further including a second end, and a pair of capacitors, each capacitor connecting the first and second portions of a respective wire together at the second end of the first and second portions.

According to the first aspect of the embodiments, each of the capacitors is adapted to pass, substantially unimpeded, a data signal between the first and second PD, and the MSPID comprises the capacitors for each of the at least one or more pairs of twisted wires, a first power source equipment (PSE)

adapted to provide the first DC power to the first PD, a second PSE adapted to provide the second DC power to the second PD, a first choke adapted to pass the first DC power from the first PSE to the first PD, and wherein the first choke is connected to the first portion of each wire of the twisted pair of wires of the EDP connected to the first powered device, and a second choke adapted to pass the second DC power from the second PSE to the second PD, and wherein the second choke is connected to the second portion of each wire of the twisted pair of wires of the EDP connected to the second PD.

According to the first aspect of the embodiments, the capacitors in each wire of the Ethernet cable are further adapted to block the first DC power from the first PSE from reaching the second PD, and to substantially simultaneously block the second DC power from the second PSE from reaching the first PD.

According to the first aspect of the embodiments, the first and second chokes each comprise a center tapped choke, the center tapped choke including a center tap, a first choke output terminal, and a second choke output terminal, and wherein the center tap of each of the first and second chokes are connected to their respective PSE.

According to the first aspect of the embodiments, the first choke output terminal of the first center tapped choke is connected to the first portion of a first twisted wire of the at least one pair of twisted wires of the EDP connected to the first PD, the second choke output terminal of the first center tapped choke is connected to the first portion of a second twisted wire of the at least one pair of twisted wires of the EDP connected to the first PD, the first choke output terminal of the second center tapped choke is connected to the second portion of a first twisted wire of the at least one pair of twisted wires of the EDP connected to the second PD, and the second choke output terminal of the second center tapped choke is connected to the second portion of a second twisted wire of the at least one pair of twisted wires of the EDP connected to the second PD.

According to the first aspect of the embodiments, the first choke comprises a pair of chokes, a first terminal of each of which is connected to each other and to an output of the first PSE, and a second terminal of each is connected to respective first portions of first and second wires of the at least one pair of twisted wires of the EDP, and the second choke comprises a pair of chokes, a first terminal of each of which is connected to each other and to an output of the second PSE, and a second terminal of each is connected to respective second portions of first and second wires of the at least one pair of twisted wires of the EDP.

According to the first aspect of the embodiments, the MSPID is further adapted to provide PoE using the Institute of Electrical Engineers (IEEE) PoE 802.11at protocol, and the first powered device can be one of an audio/video transmitter or receiver, and the second powered device can be one of an audio/video receiver or transmitter.

According to the first aspect of the embodiments, the first powered device can be an Ethernet switch, and the second powered device can be an Ethernet switch. According to the first aspect of the embodiments, the first powered device can be a video player device, and the second powered device can be a television or monitor.

According to the first aspect of the embodiments, the data communication system comprises an HDBase T Ethernet data communication system.

According to a second aspect of the embodiments, a method is provided for providing direct current (DC) power using a power-over-Ethernet (PoE) protocol in an HDBase T data communication system, the method comprising installing at least two powered devices (PD) adapted to communicate with each other using an Ethernet data path (EDP) and further adapted to receive DC power using a PoE protocol and the EDP, installing a mid-span power injection device (MSPID) between the at least two PDs, wherein the MSPID is adapted to provide a first DC power to a first of the at least two powered devices using the PoE protocol and the EDP and without the first DC power being provided to a second of the at least two powered devices, and wherein the MSPID is further adapted to provide a second DC power to the second powered device using the PoE protocol and the EDP and without the second DC power being provided to the first powered device, and further wherein, data communications can occur between the first and second powered devices using the EDP that provides respective DC power to each of the first and second powered devices.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
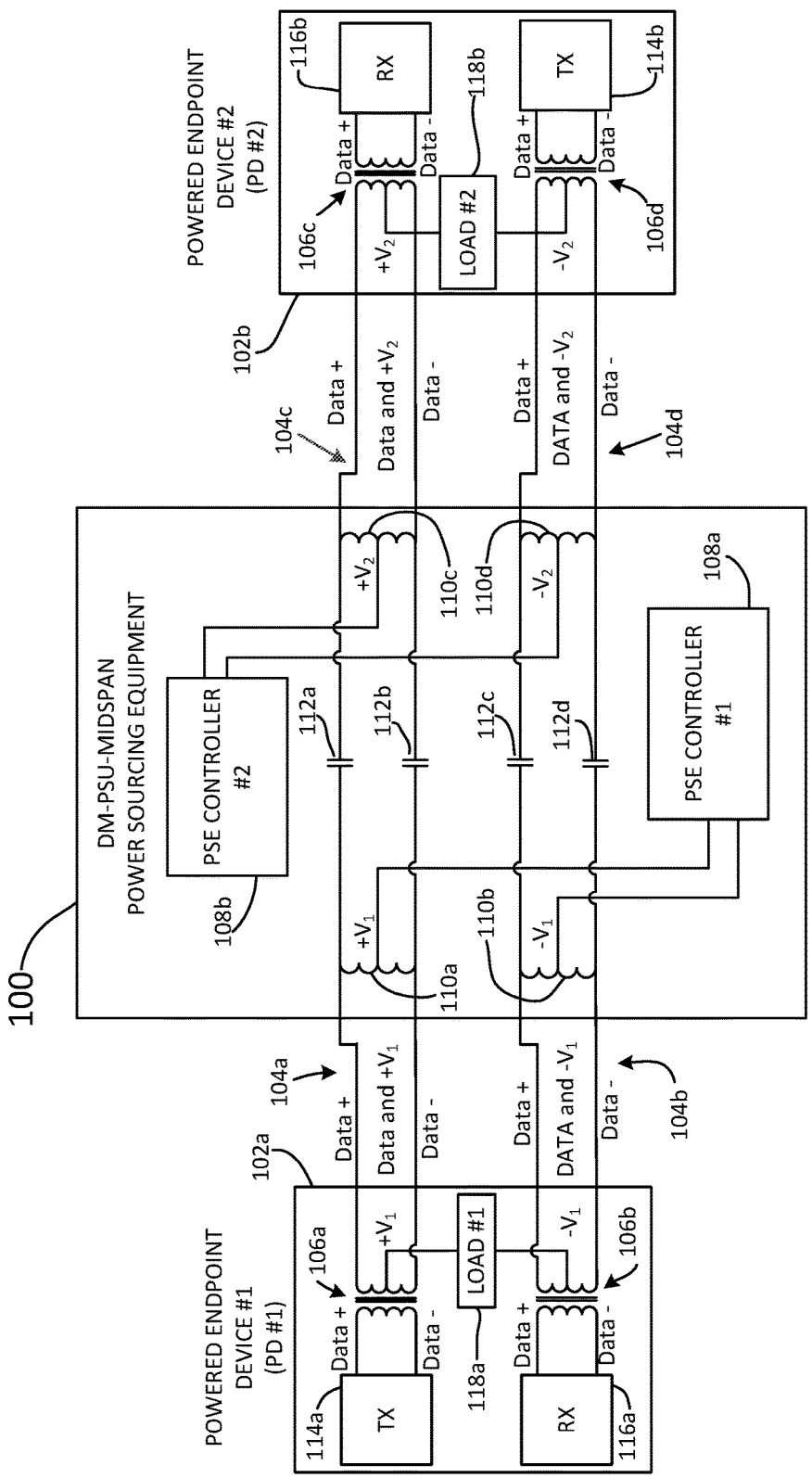

FIG. 1 illustrates a dual-sourcing isolated PoE mid-span power injection device for use with two or more powered devices according to aspects of the embodiments.

Figure 2:
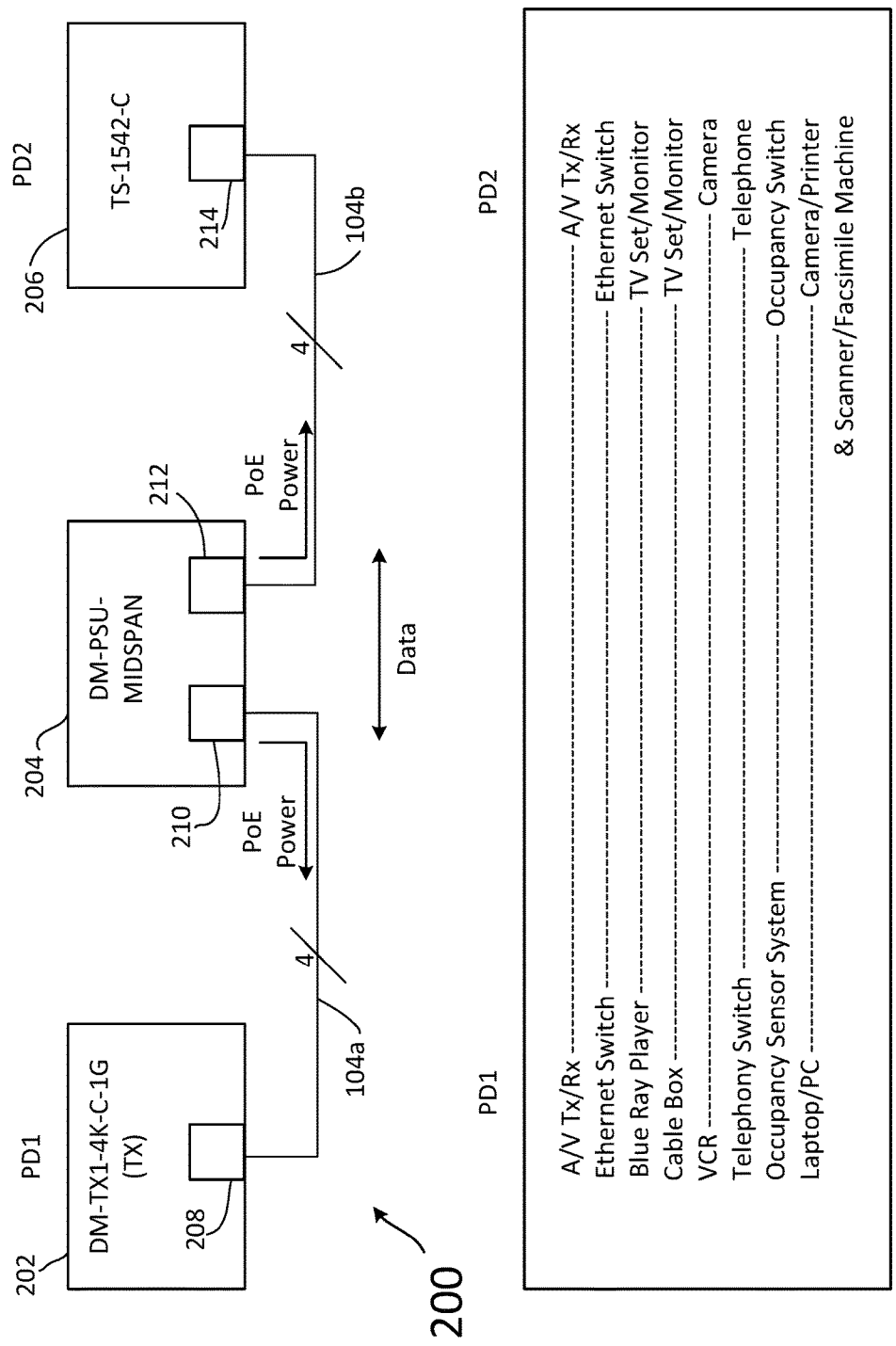

FIG. 2 illustrates the dual sourcing PoE mid-span power injection device of FIG. 1 used within an HDBase T network system that transmits HD uncompressed video according to aspects of the embodiments.

Figure 3:
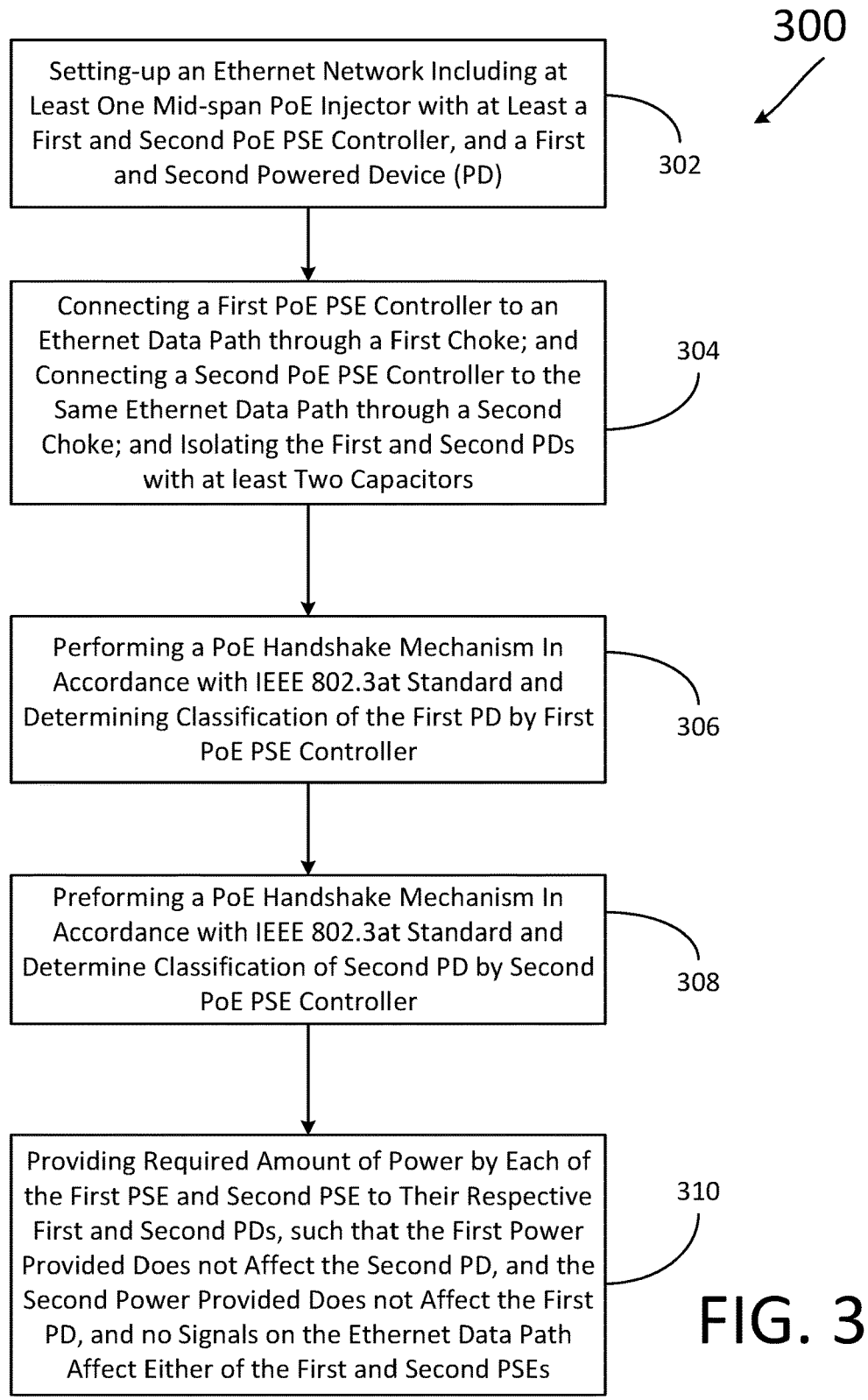

FIG. 3 illustrates a flowchart of a method for injecting power via the mid-span power injection device of FIGS. 1 and 2 according to aspects of the embodiments.

Figure 4A:
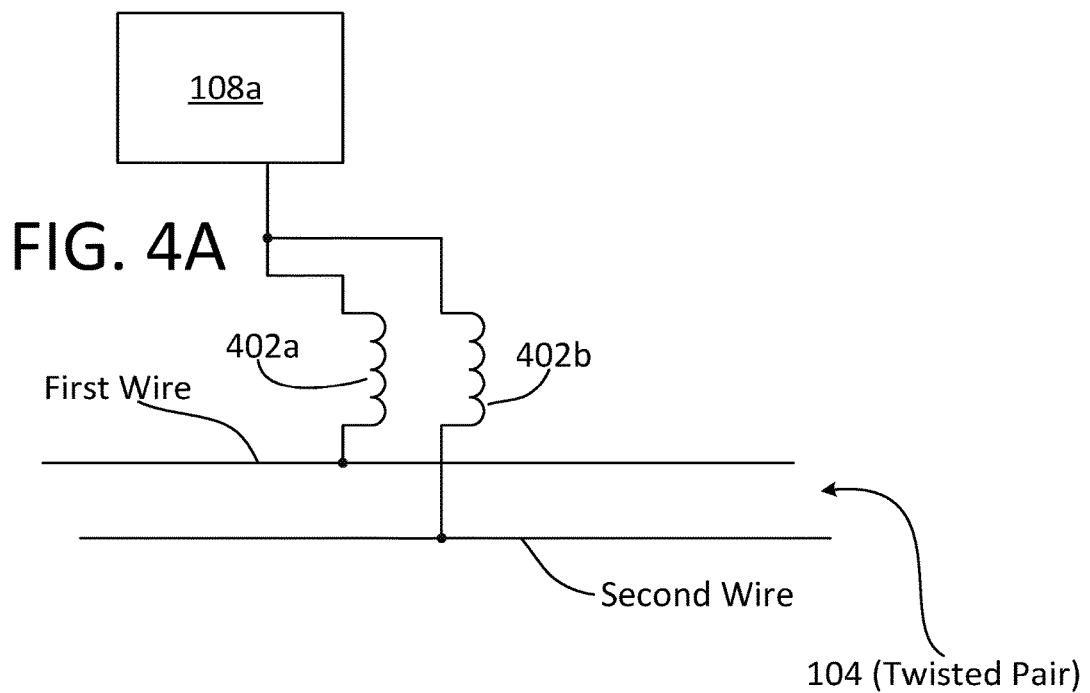
Figure 4B:
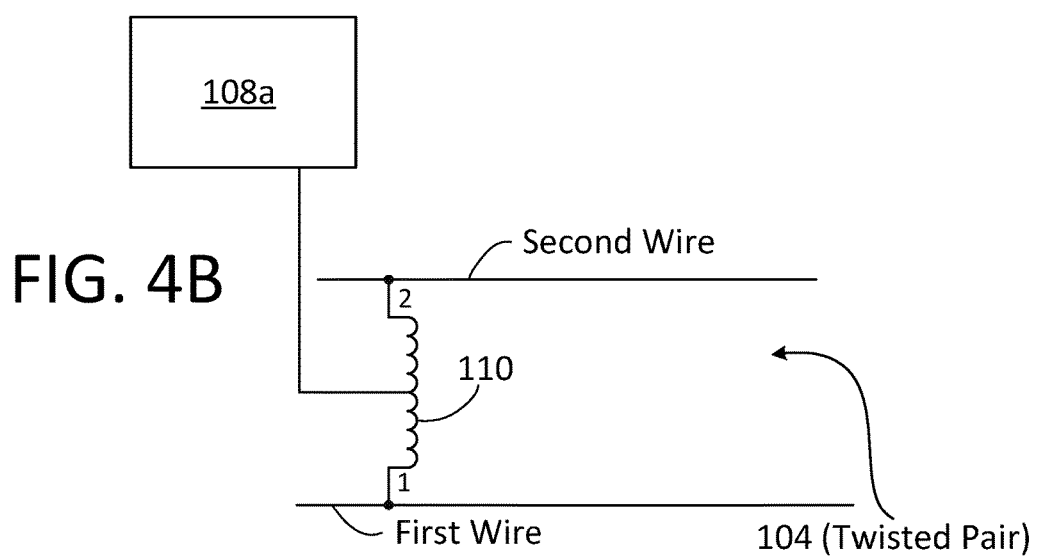

FIGS. 4A and 4B illustrate alternate aspects of the embodiments of inductive circuit elements that can be used in the mid-span power injection device of FIG. 1 according to further aspects of the embodiments.

Figure 5:
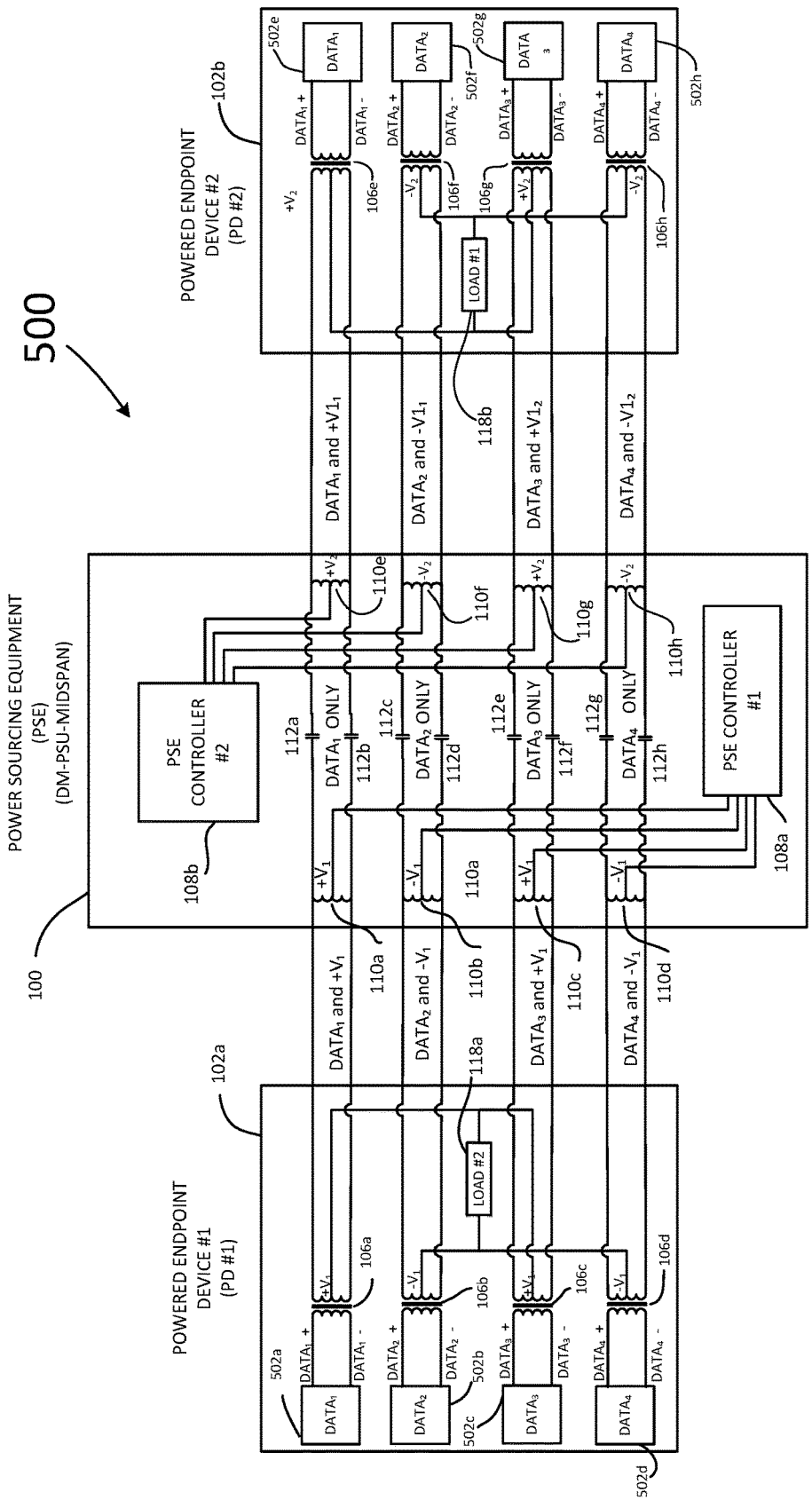

FIG. 5 illustrates a quad-sourcing isolated PoE mid-span power injection device for use with two or more powered devices according to aspects of the embodiments.

DETAILED DESCRIPTION

The embodiments are described more fully hereinafter with reference to the accompanying drawings, in which aspects of the embodiments are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the aspects of the embodiments to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as high definition video systems.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
100 Dual Source Power-over-Ethernet (PoE) Mid-Span Power Injection Device (Mid-span Power Injection Device)
102 Powered Device
104 Ethernet Data-Path
108 PoE Power Sourcing Equipment Controller
110 Center Tapped Choke
112 Capacitor
114 Powered Device Transmitter
116 Powered Device Receiver
106 Center-Tapped Transformer
118 Load
200 HDBase T Video Transfer System (System)
202 DM-TX1-4K-C-1G Transmitter (Transmitter)
204 DM-PSU Mid-span PoE supply (PoE supply)
206 TS-1542-C
208 Ethernet Connector, First
210 Ethernet Connector, Second
212 Ethernet Connector, Third
214 Ethernet Connector, Fourth
300 Method for Transferring Power-over-Ethernet via a Dual Source PoE Mid-Span Power Injection Device to at Least Two Separate Powered Devices (PDs)
302-310 Method Steps of Method 300
402 Choke
502 Transceiver

LIST OF ACRONYMS USED IN THE SPECIFICATION IN ALPHABETICAL ORDER

The following is a list of the acronyms used in the specification in alphabetical order.
AC Alternating Current
DC Direct Current
EDP Ethernet Data Path
CE Consumer Electronic
Gbit Giga-Bit
HD High Definition
HDBase T Consumer electronic and commercial connectivity standard for transmission of uncompressed high-definition video, audio, power, home networking, Ethernet, USB, and some control signals, over a common category cable with a standard connector (RJ45)
IEEE Institute of Electrical and Electronics Engineers
IP Internet Protocol
Mbit Mega-Bit
MSPID Mid-Span Power Injection Device
PD Powered Device
PoE Power-over-Ethernet
PoH Power-over-HdBase T
PoS Point-of-Sale
PSE Power Sourcing Equipment
PTZ Pan-Tilt-Zoom
Rx Receiver
Rx+ Receiver +
Rx− Receiver −
RFID Radio Frequency Identification
TV Television
Tx Transmitter
Tx+ Transmitter +
Tx− Transmitter −
μf Micro-farads
USB Universal Serial Bus
VESA Video Electronics Standards Association
V Voltage/Volt(s)
W Watt(s)

The different aspects of the embodiments described herein pertain to the context of an Ethernet-based network, but is not limited thereto, except as may be set forth expressly in the appended claims. As known by those of skill in the art, most Ethernet communications are between a device (non-switch device) and a switch. There are, however, valid use cases for two devices being connected together in which one of the devices is not a switch, e.g., both devices are non-switch devices. For example, a PoE camera can be connected directly to a PoE powered monitor. Another use case is to have a PoE powered switch and camera. This allows the switch to be located in places were no power exists. There are also use cases that include HDBase T extenders, wherein an Ethernet transmitter is connected to an Ethernet receiver, and both devices received power via the Ethernet cable, or a transmitter is connected to a power-over-HDBaseT (PoH) monitor. According to aspects of the embodiments, the discussion of FIGS. 1-5 includes several circuit components, and frequencies of data transmission; the capacitors described therein can have a value of about 0.1 microfarads (μf), and which ranges from about 0.09 μf to about 1.1 μf, and the inductors/chokes described herein can have a value of about 425 μ-henries (μh), and which ranges from about 382.5 μh to about 467.5 μh. The corresponding frequencies can be about 10 mega-hertz (MHz), and which ranges from about 9 MHz to about 11 MHz; 100 MHz, and which ranges from about 90 MHz to abut 110 MHz; 1 giga-hertz (GHz), and which ranges from about 0.9 GHz to about 1.1 GHz; and 10 GHz, and which ranges from about 9 GHz to about 11 GHz.

For 40 years Creston Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as embodied as dual source PoE mid-span power injection device (mid-span power injection device (MSPID)) 100 can be manufactured by Crestron Electronics Inc., located in Rockleigh, N.J.

FIG. 1 illustrates Power-over-Ethernet (PoE) mid-span power injection device (mid-span power injection device (MSPID) 100 for use with two or more powered devices that utilize HdBase T communications according to aspects of the embodiments. MSPID 100 comprises first through fourth capacitors 112a-d, first through fourth center tapped chokes 110a-d, and first and second power sourcing equipment controllers (PSEs) 108a,b. MSPID 100 is adapted to provide power to first powered device (PD) 102a from PSE 108a and to provide power to second PD 102b from PSE 108b. MSPID 100 is connected to first PD 102a via first Ethernet data path (EDP) 104a and second EDP 104b, and MSPID 100 is connected to second PD 102b via third and fourth EDPs 10c,d. Each of EDPs 104c,d comprise differential signal pairs of wires, generally embodied as twisted pair wires.

According to aspects of the embodiments, the manner in which first PD 102a is connected to MSPID 100 via first and second EDPs 104a,b, and the manner in which second PD 102b is connected to MSPID 100 via third and fourth EDPs 104c,d is adapted to substantially prevent DC voltages from first and second PSEs 108a,b from interfering with each other, and to allow Ethernet signals to flow between first and second PDs 102a,b substantially unimpeded, and to substantially prevent the Ethernet signals from interfering with, or corrupting, first and second PSEs 108a,b according to aspects of the embodiments.

As described above, each of EDPs 104 typically comprises a twisted-pair set of wires, embodied as differential signal, i.e., a "plus" and "minus" designated wire. In FIG. 1, this is shown as Data+ (D+) and Data− (D−), respectively, at both of PDs 102a,b. As those of skill in the art can appreciate, in some uses one of the PDs 102 can be a transmitter (in which case the respective terminations would be "transmitter" (Tx+/Tx−)), and the other "receiver" (in which case the respective terminations would be "receiver" (Rx+/Rx−)). As those of skill in the art can further appreciate, EDPs 104 can be grouped together such that a cable can be formed of two or more sets of twisted pair wires, each twisted pair comprising a different differential signal pair.

According to aspects of the embodiments, first EDP 104a is connected from first PD 102a to first and second capacitors 112a,b in the manner shown in FIG. 1, and third EDP 104c is connected to first and second capacitors 112a,b in a substantially similar manner. That is, according to aspects of the embodiments, first capacitor 112a is placed in-line in the D+ path of first EDP 104a and third EDP 104c, and second capacitor 112 b is placed in the D− path of first EDP 104a and third EDP 104c, such that alternating current (AC) signals can pass in either direction through first and third EDP 104a,c substantially un-impeded, while DC voltages are substantially blocked, in either direction, from passing through first and second capacitors 112a,b. A substantially similar arrangement is made in regard to second and fourth EDPs 104b,d, and third and fourth capacitors 112c,d such that AC signals can pass in either direction through third and fourth capacitors 112c,d substantially unimpeded, while DC voltages are substantially blocked in either direction.

In the configuration shown, and as described above, first PSE 108a provides power to first PD 102a through first center tapped choke 110a in the manner known to those of skill in the art and familiar with Institute of Electrical and Electronic Engineers (IEEE) standard 802.3at, as well as new standard 80211bt, and any updates/upgrades/new revisions thereto. To provide power, the PSE performs a process that is described in the IEEE 802.3at standard. According to IEEE 802.3at, first PSE 108a interrogates first PD 102a (and similarly, second PSE 108b interrogates second PD 102b), to determine what class of PD it is. According to IEEE 802.3at, the PSE applies a first and second voltage to extract a signature value. The PSE sources current, and measures voltage and impedance to determine the class of the PD. A load voltage is provided to the PSE by connecting a known resistive load to the first and second voltages. The PSE then performs additional voltage supplying steps in order to further ascertain the class of device of the PD. According to the protocol of IEEE 802.3at, the voltages are applied for certain specific time periods, and at certain specific levels. As those of skill in the art can appreciate, type 1 PSEs can only provide about 13 watts (W) of power, while type 2 can provide up to about 25.5 W of power, and future types, currently being planned, e.g., PoE++, will be able to provide even greater amounts of power (e.g., up to about 100 W).

The benefit of being able to supply larger amounts of power means that a broader range of devices can be used in PoE systems, such as pan-tilt-zoom (PTZ) internet protocol (IP) security cameras and access controllers, radio frequency identification (RFID) readers, thin-client computers, multi-antenna based wireless access points, 802.11n wireless access points, video phones, laptops, point-of-sale (PoS) terminals, among many other types of devices.

As described above, and according to aspects of the embodiments, EDP 104 provides for Ethernet transmissions of video, audio, and/or data, between first PD 102a and second PD 102b. Each of PDs 102a,b, however, needs power, and for numerous reasons, may only be able to obtain such power through a PoE arrangement. In this case, first PSE 108a provides power to first PD 102a through first center tapped choke 110a, and EDPs 104a,b to first PD 102a. DC voltages and current from first PSE 108a can pass through first center tapped choke 110a to each of the wires in EDP 104a,b to first PD 102a. First center tapped choke 110a also substantially prevents, or minimizes, the AC voltages of the signals from negatively affecting first PSE 108a, as inductors oppose changes in voltage due to their characteristic behavior in building up and releasing magnetic fields. That is, at about zero Hertz (Hz) (i.e., DC voltages), inductors act as a short. FIGS. 4A and 4B illustrate alternate aspects of the embodiments of inductive circuit elements that can be used in MSPID 100 of FIG. 1 according to further aspects of the embodiments.

Referring now to FIG. 4A, there is shown first and second chokes, 402a,b, connected in the manner shown such that each has a first side connected to the output of first PSE 108a, and a second side of each respectively connected to first and second wires of EDP 104 according to aspects of the embodiments. DC current from PSE 108a passes through each of first and second chokes 402a,b to the first and second wires of EDP 104.

In FIG. 4B, center tapped choke 110 is used as the inductive element in place of individual chokes 402a,b of FIG. 4A. In FIG. 4B, the output of first PSE 108a is connected to the center tap of center tapped choke 110. A first pin, pin 1, of center tapped choke 110 is connected to the first wire of EDP 104, and a second pin, pin 2, of center tapped choke 110 is connected to the second wire of EDP 104. In this manner, therefore, DC current from PSE 108*a* passes through the center tap to each of the first and second connections of center tapped choke 110 and through the first and second wires of EDP 104 to a respective PD 102.

Referring back to FIG. 1, DC voltages from first PSE 108*a* that are allowed to pass through center tapped choke 110*a* to the D+ and D− wires of EDP 104*a* are blocked from going to second PD 102*b* because of blocking capacitors 112*a,b* according to aspects of the embodiments. In a substantially similar manner, DC voltages from second PSE 108*b* that are allowed to pass through center tapped choke 110*c* to first and second wires of EDP 104*c* are blocked from going to first PD 102*a* also because of blocking capacitors 112*a,b* according to aspects of the embodiments. According to aspects of the embodiments, the DC power from either or both of first and second PSE 108*a,b* includes a positive DC voltage/current (+V1) and a negative DC voltage/current (−V1). In the case of first PSE 108*a*, the DC voltage/current passes through center tapped transformer 106*a* for +V1 from first PSE 108*a*, to load 118*a*. The negative voltage/current passes through center tapped transformer 106*b* to load 118*a*; a substantially similar means for providing power to second load 118*b* occurs in regard to second PSE 108, center tapped transformers 106*c,d* and second load 118*b* according to aspects of the embodiments.

Blocking capacitors 112*a,b* are substantially lossless when AC signals (e.g., the HDBase T data signals) are being transmitted between first PD 102*a* and second PD 102*b*. Thus, data (in the form of AC HDBase T signals, among other types) can be transferred between PDs 102*a* and 102*b*, while DC power from first PSE 108*a* is only allowed to flow to first PD 102*a*, and likewise, DC power from second PSE 108*b* is only allowed to flow to second PD 102*b*, in accordance with aspects of the embodiments.

According to further aspects of the embodiments, first and second PSEs 108,*b* can be isolated from each other, or, alternatively, do not have to be isolated from each other, meaning they can share common grounds. According to still further aspects of the embodiments, first and second PSEs 108*a,b* can be isolated from first and second PDs 102*a,b* (meaning they can "float" with respect to their respective endpoints), or not, according to still further aspects of the embodiments.

According to aspects of the embodiments, the value of the capacitors 112 used in EDP 104 is dependent upon the expected voltage level of the AC data signals, and the frequency (or communication rate). That is, in order to achieve pass through, according to aspects of the embodiments, there should be low impedance in the AC data communications lines (e.g., Ethernet lines). According to aspects of the embodiment, the value of the inductor or choke used to bridge the power supply to the data lines (Tx and Rx) depends on the voltage level of the power supply, and the frequency or communication rate of the AC data signals. According to still further aspects of the embodiments, values of the capacitors and inductors can be chosen or selected based on the expected DC voltage and current levels generated by the PSE's 108*a,b*, and frequency of the HDBase T data signals. Examples of such values can include, when using 100 MBps Ethernet, capacitors rated to withstand 100V, with a value of about 0.1 microfarads (μf), according to further aspects of the embodiments.

According to still further aspects of the embodiments, first and second PSE 108*a,b* can be combined into one device (though acting as two separate PSEs), such that separate negotiations via the IEEE 802.3at standard can take place between each PSE and its respective load (endpoints 102). According to aspects of the embodiments, while use of the IEEE 802.3at standard and conforming devices has certain advantages, it is not necessary, and the aspects of the embodiments, are not limited to use of the standard. Therefore, according to aspects of the embodiments, endpoints 102*a,b* can be IEEE 802.3at conforming devices or not, and PSEs 108*a,b* can be IEEE 802.3at conforming devices or not.

According to further aspects of the embodiments, if a non-IEEE 802.3at endpoint device, and/or PSE is used, similar handshaking process can be used as in the standard.

In FIG. 1, PD 102*a* comprises transmitter 114*a* and receiver 116*a*, each of which is connected to respective differential EDPs 104*a,b*, via respective center tapped transformer transceivers (transformers) 106*a,b*, and PD 102*b* comprises transmitter 114*b* and receiver 116*b*, each of which are connected respective differential EDPs 104*c,d*, via respective transformers 106*c,d*, in the configuration shown in FIG. 1.

That is, EDP 104*a* (and all of the EDPs in FIGS. 1 and 5) comprises Data+ and Data− lines that are connected to a first side of transformer 106*a*, and a second side of transformer 106*a* is connected to transmitter 114*a* of PD 102*a*. EDP 104*a* is connected to EDP 104*c* via capacitors 112*a,b*, so that AC voltage signals can pass substantially unimpeded (in both directions) while DC voltages and currents are substantially blocked (in both directions). Ethernet cable 104*c* is connected to a first side of transformer 106*c* of PD 102*b*, and a second side of transformer 106*c* is connected to receiver 116*b*.

In addition, EDP 104*c* comprises Data+ and Data− lines that are connected to a first side of transformer 106*c*, and a second side of transformer 106*c* is connected to receiver 116*b* of PD 102*a*. EDP 104*c* is connected to EDP 104*d* via capacitors 112*c,d*, so that AC voltage signals can pass substantially unimpeded (in both directions) while DC voltages and currents are substantially blocked (in both directions). EDP 104*d* is connected to a first side of transformer 106*d* of PD 102*b*, and a second side of transformer 106*d* is connected to transmitter 114*b*.

Capacitors 112*a-d* are adapted to provide DC blocking with respect to the outputs of PSE controller 108*a* and PSE controller 108*b*, respectively.

That is, capacitor 112*a* is provided to block +V1 VDC provided by PSE controller 108*a* from being directed to PD 102*b* on Data+ line of EDP 104*c*, and to substantially simultaneously block +V2 VDC provided by PSE controller 108*b* from being directed to PD 102*a* on Data+ line of EDP 104*a*. Capacitor 112*b* is provided to block +V1 VDC provided by PSE controller 108*a* from being directed to PD 102*b* on Data− line of EDP 104*c*, and to substantially simultaneously block +V2 VDC provided by PSE controller 108*b* from being directed to PD 102*a* on Data− line of EDP 104*a*.

Capacitor 112*c* is provided to block −V1 VDC provided by PSE controller 108*a* from being directed to PD 102*b* on Data+ line of EDP 104*d*, and to substantially simultaneously block −V2 VDC provided by PSE controller 108*b* from being directed to PD 102*a* on Data+ line of EDP 104*b*. Capacitor 112*d* is provided to block −V1 VDC provided by PSE controller 108*a* from being directed to PD 102*b* on Data− line of EDP 104*d*, and to substantially simultaneously block −V2 VDC provided by PSE controller 108*b* from being directed to PD 102*a* on Data− line of EDP 104*b*.

Also included in FIG. 1 (as well as in FIG. 5), are a plurality of loads. In FIG. 1, there is shown first load 118a, associated with PD 102a, and second load 118b, associated with PD 102b. Each of loads 118a,b can be circuitry associated with PDs 102a,b, and can include the need for positive and negative voltages, as well as convertors that can change the DC voltages to different levels, including AC voltages.

FIG. 2 illustrates use of MSPID 100 in HDBase T network system (system) 200 that transmits HD uncompressed video according to aspects of the embodiments. System 200 comprises, by way of non-limiting example only, DM-TX1-4K-C-1G transmitter (transmitter) 202 (PD1), DM-PSU Midspan PoE supply (PoE supply) 204, and TS-1542-C (PD2) 206. The DM-TX1-4K-C-1G provides a 1-gang mountable interface for a HD or 4K source as part of a complete DigitalMedia™ System. The DM-TX1-4K-C-1G can connect to a DM 8G+® input of a DM® switcher or receiver, and can be powered by the PoE mid-span supply 204, via a single CATx Ethernet cable. The TS-1542-C device provide a full HD 1080p touch screen suitable for installation on a wall, tabletop, or Video Electronics Standards Association (VESA), which is a family of standards defined by VESA for mounting flat panel monitors, TVs, and other displays to stands or wall mounts. It is implemented on most modern flat-panel monitors and TVs. The TS-1542-C feature Smart Graphics performance, dual-window HD streaming video display, annotation, voice recognition, web browsing, and Rava SIP intercommunications, among other features. Further, the TS-1542-C connects to the DM 8G+ output of a DM switcher or transmitter, and can be powered by the PoE mid-span supply 204, via a single CATx Ethernet cable.

As shown in FIG. 2, PoE power is transmitted along the 4 line Ethernet Cable (four differential pairs; see, FIG. 5 for an illustration of four differential pairs of Ethernet cable in a system that injects PoE according to aspects of the embodiments) by mid-span PoE injector 204. PD 1, which in this example, comprises Ethernet connector 208 that connects EDP 104a to Ethernet connector 210 at mid-span PoE 204, and Ethernet connector 212 provides a connection for EDP 104b that is connected to PD 2 at Ethernet connector 214. According to further aspects of the embodiments, as shown in FIG. 2, each of PD1 202 and PD2 206 can comprise a plurality of different devices designed to work with corresponding devices. For example, in the box there is shown, under PD1, Blue Ray Player, which corresponds to (or which can be in communication with) a television (TV) set and/or monitor, listed under PD2. Other devices are listed under PD1 that correspond to a second list under PD2. As those of skill in the art can appreciate, these lists are merely examples of some devices that can be used with other corresponding devices, and such a list is not, and should be taken in a limiting manner.

HDBase T, promoted and advanced by the HDBase T Alliance, is a consumer electronic (CE) and commercial connectivity standard for transmission of uncompressed HD, audio, power, home networking, Ethernet, universal serial bus (USB), and some control signals, over a common category (Cat5e or above) cable with a standard connector (RJ45).

As described above, FIG. 5 illustrates a quad-sourcing isolated PoE mid-span power injection device 100 for use with two or more Ethernet endpoint devices according to aspects of the embodiments. The system of FIG. 5 is substantially similar to that of FIG. 1, with the exception of there being four EDPs 104a-d, eight capacitors 112a-h, eight center tapped chokes 110a-h, eight center tapped transformers 106a-h, and other changes to incorporate the increased number of EDPs. Further, the transmitters and receivers of FIG. 1 have been replaced with transceivers 502a-h. However, as those of skill in the art can appreciate based on the discussion of FIG. 1, the circuitry of FIG. 5 operates in a substantially similar manner as that of FIG. 1. Therefore, in fulfillment of the dual purposes of clarity and brevity, a detailed discussion of FIG. 5 has been omitted from herein.

FIG. 3 illustrates a flowchart of method 300 for injecting power to Ethernet endpoint devices in an Ethernet network using MDPID 100 of FIG. 1 according to aspects of the embodiments.

Method 300 begins with method step 302, in which an HDBase T communications system/network is set up, including at least one MSPID 100, and with at least a first and second PD 102a,b according to aspects of the embodiments. For the sole purposes of making the discussion of method 300 satisfy the dual purposes of clarity and brevity, and not to be taken in a limiting manner, discussion shall be made of center tapped chokes 110a,b in the manner shown in FIG. 1 in MSPID 100, though as those of skill in the art can now appreciate, the use of individual chokes 402a,b or a single side of a transformer can also be implemented, as well as their respective equivalents, according to further aspects of the embodiments.

In method step 304, the user connects first PSE 108a to EDP 104a through first center tapped choke 110a, such that DC power (+V1) from PSE 108a passes through first center tapped choke 110a to each of the first and second wires (i.e., the twisted pair) of EDP 104a. That is, the +V1 output of PSE 108a is connected to the center tap of center tapped choke 110a, and a first output is connected to the first wire of EDP 104a, and the second output is connected to the second wire of EDP 104a. Further in method step 304, the user connects second PSE 108b to EDP 104c through third center tapped choke 110c such that DC power (+V2) from PSE 108b passed through third center tapped choke 110c to each of the first and second wires (i.e., the twisted pair) of EDP 104c (in a substantially similar manner as that of first PSE 108a being connected to EDP 104a through first center tapped choke 110a).

In addition, also in method step 304, the user locates first capacitor 112a in the first wire of EDP 104a and 104c (such that the two first wires are connected to each other through first capacitor 112a) and the user locates second capacitor 112b in the second wire of EDP 104a and 104c (such that the two second wire are connected to each other through second capacitor 112b) according to aspects of the embodiments, such that DC voltage (+V1 and +V2) and current passes through first and third chokes 110a,c to their respective PDs 102a,b, but is blocked by first and second capacitors 112a,b, and that AC voltage and currents are blocked by first and third center tapped chokes 110a,c, and passes through first and second capacitors 112a,b, according to further aspects of the embodiments.

As those of skill in the art can appreciate, method step 304 can be done during manufacture of MSPID 100 prior to interfacing it with EDPs 104a-d such that upon connection between first and second EDPs 104a,b to MSPID 100, and upon connection between third and fourth EDPs 104c,d to MSPID 100 (and additional EDPs 104, if that is the case), such interconnections as described above in regard to the capacitors and chokes is already in place.

In method steps 306 and 308, presuming that IEEE 802.3at conforming devices being used, the handshaking as described in the IEEE 802.3at standard is performed, such that a classification of endpoint devices—PDs 102a,b—can be ascertained. However, as described above, use of MSPID 100 is not constrained to IEEE 802.3at devices, or similar ones, and can be used in Ethernet networks in which much higher (or lower) power levels are or can be used. Following either method step 306, or 308, method step 310 is performed and the required amount of power is sent by first and second PSE 108a,b to their respective first and second PDs 102a,b. As those of skill in the art can appreciate, the aspects of the embodiments, are not limited to just a first and second PSEs 108a,b, nor to only first and second PDs 102a,b; that is, there can be a single large PSE within MSPID 100, and numerous PDs 102. While aspects of the embodiments are directed to isolating the power supply output between pairs of PDs, such is not to be taken in a limiting manner. That is, it is possible to have an HDBase T network in which a single PD, e.g., 102a, is connected to multiple other PDs 102b,c,d, and each of them are power isolated from each other in a substantially similar arrangement as that shown in FIG. 1, according to further aspects of the embodiments.

INDUSTRIAL APPLICABILITY

To solve the aforementioned problems, the aspects of the embodiments are directed towards systems, methods, and modes for supplying power to Ethernet based devices using power-over-Ethernet (PoE) cabling systems via a mid-span power injection device.

The disclosed embodiments provide a system, software, and method for transferring power over Ethernet cable via a dual source PoE MD PID 100 to at Least two separate endpoints/PDs. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A data communication system using power over Ethernet (PoE) for power distribution, comprising:
   a first and second powered device (PD), each of which is adapted to communicate with each other through a first Ethernet data path (EDP) and is further adapted to receive direct current (DC) power using a PoE protocol; and
   a mid-span power injection device (MSPID) adapted to provide a communications interface such that data communications passes through the MSPID to and from each of the PDs, and wherein
   the MSPID is further adapted to provide a first DC power to the first PD using the first EDP, and to provide a second DC power to the second PD using the first EDP, wherein
   the first EDP comprises
      a first pair of twisted wires, each of the twisted wires of the first pair of twisted wires including a first portion and a second portion, each of the first and second portions including a first end connected to a respective PD, and each of the first and second portions further including a second end, and
      a first pair of capacitors, each capacitor of the first pair of capacitors connecting the first and second portions of a respective wire together at the second end of the first and second portions, and wherein
   the MSPID comprises
      the first pair of capacitors for the first pair of twisted wires;
      a first power source equipment (PSE) adapted to provide the first DC power to the first PD;
      a second PSE adapted to provide the second DC power to the second PD;
      a first choke adapted to pass the first DC power from the first PSE to the first PD, and wherein the first choke is connected to the first portion of each wire of the first pair of twisted wires of the first EDP connected to the first PD; and
      a second choke adapted to pass the second DC power from the second PSE to the second PD, and wherein the second choke is connected to the second portion of each wire of the first pair of twisted wires of the first EDP connected to the second PD.

2. The data communication system according to claim 1, wherein each of the capacitors is adapted to pass, substantially unimpeded, a data signal between the first and second PD.

3. The data communication system according to claim 1, wherein
   the MSPID is further adapted to provide a third DC power to the first PD using a second EDP, and to provide a fourth DC power to the second PD using the second EDP, and wherein
   the second EDP comprises
      a second pair of twisted wires, wherein each of the twisted wires of the second pair of twisted wires includes a first portion and a second portion, each of the first and second portions including a first end connected to a respective PD, and each of the first and second portions further including a second end, and a second pair of capacitors, each capacitor of the second pair of capacitors connecting the first and second portions of a respective wire together at the second end of the first and second portions, and wherein the MSPID further comprises the second pair of capacitors for the second pair of twisted wires;

the first PSE adapted to provide a third DC power to the first PD;

the second PSE adapted to provide a fourth DC power to the second PD;

a third choke adapted to pass the third DC power from the first PSE to the first PD, and wherein the third choke is connected to the first portion of each wire of the second pair of twisted wires of the second EDP connected to the first PD; and a fourth choke adapted to pass the fourth DC power from the second PSE to the second PD, and wherein the fourth choke is connected to the second portion of each wire of the second pair of twisted wires of the second EDP connected to the second PD.

4. The data communication system according to claim 3, wherein the first pair of capacitors in respective wires of the first and second EDPs are further adapted to block the first DC power from the first PSE from reaching the second PD, and to substantially simultaneously block the second DC power from the second PSE from reaching the first PD, and wherein the second pair of capacitors in respective wires of the first and second EDPs are further adapted to block the third DC power from the first PSE from reaching the second PD, and to substantially simultaneously block the fourth DC power from the second PSE from reaching the first PD.

5. The data communication system according to claim 3, wherein each of the first, second, third, and fourth chokes each comprise:

a center tapped choke, the center tapped choke including a center tap, a first choke output terminal, and a second choke output terminal, and wherein the center tap of each of the first and second chokes are connected to their respective PSE.

6. The data communication system according to claim 5, wherein the first choke output terminal of the first center tapped choke is connected to the first portion of a first twisted wire of the first pair of twisted wires of the first EDP connected to the first PD, the second choke output terminal of the first center tapped choke is connected to the first portion of a second twisted wire of the first pair of twisted wires of the first EDP connected to the first PD, the first choke output terminal of the second center tapped choke is connected to the second portion of a first twisted wire of the first pair of twisted wires of the first EDP connected to the second PD, and the second choke output terminal of the second center tapped choke is connected to the second portion of a second twisted wire of the first pair of twisted wires of the first EDP connected to the second PD.

7. The data communication system according to claim 3, wherein the first choke comprises a pair of chokes, a first terminal of each of which is connected to each other and to an output of the first PSE, and a second terminal of each is connected to respective first portions of first and second wires of the first pair of twisted wires of the EDP, and the second choke comprises a pair of chokes, a first terminal of each of which is connected to each other and to an output of the second PSE, and a second terminal of each is connected to respective second portions of first and second wires of the first pair of twisted wires of the EDP.

8. The data communication system according to claim 1, wherein the MSPID is further adapted to provide PoE using the Institute of Electrical Engineers (IEEE) PoE 802.11at protocol.

9. The data communication system according to claim 1, wherein the first powered device can be one of an audio/video transmitter or receiver, and the second powered device can be one of an audio/video receiver or transmitter.

10. The data communication system according to claim 1, wherein the first powered device can be an Ethernet switch, and the second powered device can be an Ethernet switch.

11. The data communication system according to claim 1, wherein the first powered device can be a video player device, and the second powered device can be a television or monitor.

12. The data communication system according to claim 1, wherein the data communication system comprises:

an HDBase T Ethernet data communication system.

13. A method for providing direct current (DC) power using a power-over-Ethernet (PoE) protocol in an HDBase T data communication system, comprising:

installing at least two powered devices (PDs) adapted to communicate with each other using a first and second Ethernet data path (EDP) and further adapted to receive DC power using a PoE protocol and the first and second EDPs; and installing a mid-span power injection device (MSPID) between the at least two PDs, wherein the MSPID is adapted to provide a first DC power to a first of the at least two PDs using the PoE protocol and the first EDP and without the first DC power being provided to a second of the at least two PDs, and wherein the MSPID is further adapted to provide a second DC power to the second PD using the PoE protocol and the first EDP and without the second DC power being provided to the first PD, and further wherein, data communications can occur between the first and second PDs using the first EDP that provides respective DC power to each of the first and second PDs, wherein each of the first and second EDPs comprises a first pair of twisted wires, each of the twisted wires of the first pair of twisted wires including a first portion and a second portion, each of the first and second portions including a first end connected to a respective PD, and each of the first and second portions further including a second end, and a first pair of capacitors, each capacitor of the first pair of capacitors connecting the first and second portions of a respective wire together at the second end of the first and second portions, wherein the MSPID comprises
the first pair of capacitors for the first pair of twisted wires;
a first power source equipment (PSE) adapted to provide the first DC power to the first PD;
a second PSE adapted to provide the second DC power to the second PD;
a first choke adapted to pass the first DC power from the first PSE to the first PD, and wherein the first choke is connected to the first portion of each wire of the first pair of twisted wires of the first EDP connected to the first PD; and
a second choke adapted to pass the second DC power from the second PSE to the second PD, and wherein the second choke is connected to the second portion of each wire of the first pair of twisted wires of the first EDP connected to the second PD.

14. The method according to claim 13, wherein,
the MSPID is further adapted to provide a third DC power to a first of the at least two PDs using the PoE protocol and the second EDP and without the third DC power being provided to the second of the at least two PDs, and wherein
the MSPID is further adapted to provide a fourth DC power to the second PD using the PoE protocol and the second EDP and without the fourth DC power being provided to the first PD, and further wherein,
data communications can occur between the first and second PDs using the second EDP that provides respective DC power to each of the first and second PDs.

15. The data communication system according to claim 1, further comprising:
a second EDP, and wherein
data communications pass through the MSPID to and from each of the PDs through the first and second EDPs, and wherein
the MSPID is still further adapted to provide a third DC power to the first PD using the second EDP, and to provide a fourth DC power to the second PD using the second EDP.

16. The data communication system according to claim 5, wherein
the first choke output terminal of the third center tapped choke is connected to the first portion of a first twisted wire of the second pair of twisted wires of the second EDP connected to the first PD,
the second choke output terminal of the third center tapped choke is connected to the first portion of a second twisted wire of the second pair of twisted wires of the second EDP connected to the first PD,
the first choke output terminal of the fourth center tapped choke is connected to the second portion of a first twisted wire of the second pair of twisted wires of the second EDP connected to the second PD, and
the second choke output terminal of the fourth center tapped choke is connected to the second portion of a second twisted wire of the second pair of twisted wires of the second EDP connected to the second PD.

17. A data communication system using power over Ethernet (PoE) for power distribution, comprising:
a first and second powered device (PD), each of which is adapted to communicate with each other through a first and second Ethernet data path (EDP), and wherein each of which is further adapted to receive direct current (DC) power using a PoE protocol; and
a mid-span power injection device (MSPID) adapted to provide a bi-directional communications interface between the first and second PDs using the first and second EDPs, and wherein
the MSPID is further adapted to
provide a first set of DC power to the first PD using the first and second EDP, and to
provide a second set of DC power to the second PD using the first and second EDP, and to
substantially prevent the first set of DC power from reaching the second PD, and to
substantially prevent the second set of DC power from reaching the first PD, wherein
each of the first and second EDPs comprises
a first pair of twisted wires, each of the twisted wires of the first pair of twisted wires including a first portion and a second portion, each of the first and second portions including a first end connected to a respective PD, and each of the first and second portions further including a second end, and
a first pair of capacitors, each capacitor of the first pair of capacitors connecting the first and second portions of a respective wire together at the second end of the first and second portions, wherein the MSPID comprises
the first pair of capacitors for the first pair of twisted wires;
a first power source equipment (PSE) adapted to provide the first DC power to the first PD;
a second PSE adapted to provide the second DC power to the second PD;
a first choke adapted to pass the first DC power from the first PSE to the first PD, and wherein the first choke is connected to the first portion of each wire of the first pair of twisted wires of the first EDP connected to the first PD; and
a second choke adapted to pass the second DC power from the second PSE to the second PD, and wherein the second choke is connected to the second portion of each wire of the first pair of twisted wires of the first EDP connected to the second PD.

* * * * *